United States Patent
Zhang et al.

(10) Patent No.: US 12,423,126 B2
(45) Date of Patent: Sep. 23, 2025

(54) POD DEPLOYMENT METHOD AND APPARATUS

(71) Applicant: HUAWEI TECHNOLOGIES CO., LTD., GuangDong (CN)

(72) Inventors: Wenbo Zhang, Shenzhen (CN); Hai Xia, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 629 days.

(21) Appl. No.: 17/752,102

(22) Filed: May 24, 2022

(65) Prior Publication Data

US 2022/0283846 A1    Sep. 8, 2022

Related U.S. Application Data

(63) Continuation of application No. PCT/CN2020/107865, filed on Aug. 7, 2020.

(30) Foreign Application Priority Data

Nov. 26, 2019 (CN) .......................... 201911172893.7

(51) Int. Cl.
*G06F 9/455* (2018.01)
*G06F 9/48* (2006.01)
*G06F 9/50* (2006.01)

(52) U.S. Cl.
CPC ........ *G06F 9/45558* (2013.01); *G06F 9/4881* (2013.01); *G06F 9/5055* (2013.01);
(Continued)

(58) Field of Classification Search
None
See application file for complete search history.

(56) References Cited

U.S. PATENT DOCUMENTS 8,255,915 B1    8/2012 Blanding et al.
11,755,354 B2 * 9/2023 Patle .................. G06F 12/0246
                                                 718/1
(Continued)

FOREIGN PATENT DOCUMENTS

CN    101354663 A    1/2009
CN    105224392 A    1/2016
(Continued)

OTHER PUBLICATIONS

Brownlow et al., "CPU Management—CPU Pinning and Isolation in Kubernetes* Technology Guide", pp. 1-24, dated: Jan. 2021, retrieved from URL:<https://cdrdv2-public.intel.com/606834/CPUManagement_CPU_Pinning_and_Isolation_in_Kubernetes_TechnologyGuide_606834v3.pdf> (Year: 2021).*

(Continued)

*Primary Examiner* — Mustafa A Amin
(74) *Attorney, Agent, or Firm* — Rimon PC

(57) ABSTRACT

A master node receives an instruction for deploying one or more scheduling domains, where the instruction includes a quantity of each type of resources occupied by each of the scheduling domains. The master nodeselects a worker node for deploying the one or more scheduling domains, and sends, to the worker node, the instruction for deploying the one or more scheduling domains. The master node further sends, to the worker node based on association information of a scheduling domain, an instruction for deploying one or more pods, where the instruction for deploying the one or more pods includes a quantity of pods, a quantity of containers included in each pod, and an identifier of the scheduling domain to which resources used by the one or more pods belong.

18 Claims, 8 Drawing Sheets

(52) U.S. Cl.
CPC .............. *G06F 2009/45562* (2013.01); *G06F 2009/4557* (2013.01); *G06F 2209/5011* (2013.01)

(56) References Cited

U.S. PATENT DOCUMENTS

| | | | |
|---|---|---|---|
| 2016/0216986 A1* | 7/2016 | Singh | G06F 9/485 |
| 2017/0091479 A1* | 3/2017 | Pluder | G06F 21/6245 |
| 2018/0173567 A1* | 6/2018 | Olshefski | G06F 9/50 |
| 2018/0329757 A1* | 11/2018 | Patgar | G06F 9/45558 |
| 2019/0081955 A1* | 3/2019 | Chugtu | H04L 63/0236 |
| 2022/0156661 A1* | 5/2022 | Xu | H04L 41/0826 |

FOREIGN PATENT DOCUMENTS

| | | |
|---|---|---|
| CN | 109471725 A | 3/2019 |
| CN | 110287029 A | 9/2019 |

OTHER PUBLICATIONS

Remy Lemeunier, "Kubernetes: Shared storage volume between multiple pods on Amazon," Jun. 6, 2019; 10 pages (Jun. 6, 2019), pp. 1-10, XP093093169.

Jose Santos et al: "Resource Provisioning in Fog Computing: From Theory to Practice", Sensors, vol. 19, No. 2238, May 14, 2019 (May 14, 2019), pp. 1-25, XP055767188, Total 25 Pages.

Jose Santos et al: "Towards Network-Aware Resource Provisioning in Kubernetes for Fog Computing Applications", 2019 IEEE Conference on Network Softwarization (Netsoft), IEEE, Jun. 24, 2019 (Jun. 24, 2019), pp. 351-359, XP033602018, Total 9 Pages.

Anonymous: "Gang scheduling—Wikipedia", Nov. 22, 2019, pp. 1-8, XP055978159, Total 8 Pages.

\* cited by examiner

POD DEPLOYMENT METHOD AND APPARATUS

CROSS-REFERENCE TO RELATED APPLICATIONS

This application is a continuation of International Application No. PCT/CN2020/107865, filed on Aug. 7, 2020. The International Application claims priority to Chinese Application No. 201911172893.7, filed on Nov. 26, 2019. The disclosures of the aforementioned applications are hereby incorporated by reference in their entireties.

TECHNICAL FIELD

Embodiments of this application relate to the field of cloud computing technologies, and in particular, to a pod deployment method and apparatus.

BACKGROUND

Various virtual machine technologies usher in the cloud computing era, and the technology of containers is emerging as the next generation virtualization technology. A container is a virtual environment container. It may be considered as a lightweight virtual machine. Both the virtual machine and the virtual environment container can isolate applications. The difference between the container and the virtual machine is that the virtual machine depends on a virtual machine management system (Hypervisor), while the container is managed by a container engine. The Hypervisor is used to run a plurality of guest operating systems on a host operating system, and each guest operating system can be considered as a virtual machine. The virtual machine takes minutes to start, while the container can start within milliseconds.

Currently, in the field of container orchestration, a kubernetes (K8s) container cluster management system (management system for short) is the most popular. K8s can construct container deployment services. A pod is a basic deployment unit of K8s. One pod consists of a group of containers working on a same node.

In the conventional technology, an administrator delivers an instruction for deploying one or more pods to a management system, where the instruction may include a quantity of pods, a quantity of containers included in each pod, a maximum quantity of each type of resources used by each container when working, and other information. An example of deploying one pod is used to describe a manner of allocating resources to the pod. For each type of resources, the management system determines a sum of a maximum quantity of the type of resources used by each of a plurality of containers in the pod when each container is working. The sum is a theoretical resource value of the type of resources used by the pod. The management system selects an appropriate worker node for deploying the pod, and the worker node allocates a resource corresponding to the theoretical resource value to the deployed pod. For example, one pod includes two containers. When a container a is working, theoretically a maximum of two CPUs are used. When the other container b is working, theoretically a maximum of one CPU is used. In this case, the worker node allocates three CPUs to the pod. If the two containers use the resource in different time periods, theoretically the worker node can allocate two CPUs to the pod. Two CPUs are sufficient for containers a and b. In this case, allocating three CPUs based on the maximum quantity of resources used by each container when working causes a resource waste.

SUMMARY

Embodiments of this application provide a pod deployment method and apparatus, to resolve a resource waste that occurs because currently resources are allocated to a pod based on a maximum quantity of resources used by each container in the pod when the container is working.

According to a first aspect, a pod deployment method is provided. The method can be applied to a master node. The master node may receive an instruction that is for deploying one or more scheduling domains and that is delivered by an administrator, a tenant, or a user. The instruction includes a quantity of each type of resources occupied by each of the scheduling domains, and the resources occupied by the scheduling domain are used by at least one pod. Then, the master node selects a worker node for deploying the one or more scheduling domains, and sends, to the worker node, the instruction for deploying the one or more scheduling domains. The instruction includes the quantity of each type of resources occupied by each of the scheduling domains. The master node receives an instruction for deploying one or more pods. The instruction includes a quantity of pods, a quantity of containers included in each pod, and association information of a scheduling domain. Further, the master node sends, to the worker node based on the association information of the scheduling domain, the instruction for deploying the one or more pods. The instruction includes the quantity of pods, the quantity of containers included in each pod, and an identifier of the scheduling domain to which resources used by the one or more pods belong. It should be noted that receiving by the master node the instruction for deploying the one or more scheduling domains and receiving by the master node the instruction for deploying the one or more pods may not be subject to a specific sequence.

The scheduling domain is deployed on the worker node in advance to reserve a part of resources for the one or more pods. Further, when the one or more pods are being deployed, the one or more pods are enabled to use resources in the scheduling domain, and resources do not need to be allocated to the pod based on a maximum quantity of resources used by each container in the pod. Containers in a plurality of pods can use resources in the scheduling domain, to reduce a resource waste.

In a possible implementation, for any type of resources that are occupied by the scheduling domain and that are used by the pod, a quantity of the type of resources is less than a sum of a maximum quantity of the type of resources needed by each container when working, and is not less than a maximum quantity of the type of resources needed by any container when working, to ensure that all the containers can work normally when working in different time periods. This further reduces a resource waste.

In a possible implementation, the association information of the scheduling domain is an identifier of the scheduling domain, a type of the scheduling domain, or an identifier of the worker node. In this case, the master node may determine, based on the identifier of the scheduling domain, the type of the scheduling domain, or the identifier of the worker node, the worker node and the scheduling domain for deploying the one or more pods. The worker node and the scheduling domain for deploying the one or more pods can be flexibly determined in a plurality of manners. This improves user experience.

In a possible implementation, after sending, to the worker node, the instruction for deploying the one or more scheduling domains, the master node may update a remaining quantity of each type of resources in the worker node in a resource list, and updates a remaining quantity of each type of resources in a resource pool, where the resource pool includes a plurality of worker nodes. In this way, resource usage is correctly recorded and resource utilization is further improved.

In a possible implementation, the master node may select, from the plurality of worker nodes according to a resource optimal policy, a worker node for deploying the one or more scheduling domains. Alternatively, when the instruction for deploying the one or more scheduling domains received by the master node further includes the identifier of the worker node, the master node may use the worker node corresponding to the identifier as the worker node for deploying the one or more scheduling domains.

In a possible implementation, if the quantity of each type of resources occupied by the scheduling domain includes a quantity of CPUs occupied by the scheduling domain, the instruction for deploying the one or more scheduling domains received by the master node may further include a quantity of CPUs for isolated use of a container in a pod and/or a quantity of CPUs for shared use of containers in a pod. The instruction for deploying the one or more pods received by the master node may further include: an identifier of a first container that uses a CPU in isolation from another container. In this way, the worker node allocates a corresponding quantity of CPUs in the scheduling domain to the first container for exclusive use, and the first container does not share these CPUs with another container. This improves performance of the first container.

In a possible implementation, the master node may receive an instruction for deleting a scheduling domain, where the instruction includes an identifier of the scheduling domain. Then, the master node determines whether there is a pod that uses a resource in the scheduling domain with the identifier. If yes, the master node sends prompt information indicating that the scheduling domain cannot be deleted. If no, the master node may send the instruction for deleting the scheduling domain to a worker node on which the scheduling domain is deployed. The instruction that is for deleting the scheduling domain and that is sent by the master node to the worker node includes the identifier of the to-be-deleted scheduling domain.

According to a second aspect, a pod deployment method is provided. The method can be applied to a worker node. The worker node may receive an instruction that is for deploying one or more scheduling domains and that is sent by the master node. The instruction includes a quantity of each type of resources occupied by each of the scheduling domains. Then the worker node deploys the scheduling domain based on the instruction for deploying the one or more scheduling domains. The deployed scheduling domain includes a corresponding quantity of a corresponding type of resources. The worker node may further receive an instruction that is for deploying one or more pods and that is sent by the master node. The instruction for deploying the one or more pods may include a quantity of pods, a quantity of containers included in each pod, and an identifier of a scheduling domain to which resources used by the one or more pods belong. Then, a corresponding quantity of pods may be deployed on the worker node, and each pod includes a corresponding quantity of containers. In addition, the worker node controls, when any container works, the container to use a resource in the scheduling domain.

The scheduling domain is deployed on the worker node in advance to reserve a part of resources for the one or more pods. Further, when the one or more pods are being deployed, the one or more pods are enabled to use resources in the scheduling domain, and resources do not need to be allocated to the pod based on a maximum quantity of resources used by each container in the pod. Containers in a plurality of pods can use resources in the scheduling domain, to reduce a resource waste.

In a possible implementation, for any type of resources that are occupied by the scheduling domain and that are used by the pod, a quantity of the type of resources is less than a sum of a maximum quantity of the type of resources needed by each container when working, and is not less than a maximum quantity of the type of resources needed by any container when working, to ensure that all the containers can work normally when working in different time periods. This further reduces a resource waste.

In a possible implementation, if the quantity of each type of resources occupied by the scheduling domain includes the quantity of CPUs occupied by the scheduling domain, the instruction for deploying the one or more scheduling domains received by the worker node may further include a quantity of CPUs for isolated use of a container in a pod and/or a quantity of CPUs for shared use of containers in a pod. The instruction for deploying the one or more pods received by the worker node may further include: an identifier of a first container that uses a CPU in isolation from another container. Then, the worker node controls, when the first container is working, the first container to use a CPU for isolated use in the scheduling domain; and the worker node controls, when another container different from the first container is working, the another container to use another CPU that is in the scheduling domain and that is not for isolated use. In this way, the worker node allocates a corresponding quantity of CPUs in the scheduling domain to the first container for exclusive use, and the first container does not share these CPUs with another container. This improves performance of the first container.

According to a third aspect, a pod deployment apparatus is provided. The communication has functions of implementing any one of the first aspect and possible implementations of the first aspect. The functions may be implemented by hardware, or may be implemented by hardware executing corresponding software. The hardware or the software includes one or more functional modules corresponding to the foregoing function.

According to a fourth aspect, a pod deployment apparatus is provided. The communication has functions of implementing any one of the second aspect and possible implementations of the second aspect. The functions may be implemented by hardware, or may be implemented by hardware executing corresponding software. The hardware or the software includes one or more functional modules corresponding to the foregoing function.

According to a fifth aspect, a pod deployment apparatus is provided. The apparatus may be the master node in the foregoing method embodiments, or may be a chip disposed in the master node. The apparatus includes a communication interface and a processor. Optionally, the communication apparatus further includes a memory. The memory is configured to store a computer program or instructions, and the processor is separately coupled to the memory and the communication interface. When the processor executes the computer program or instructions, the apparatus performs, by using the communication interface, the method performed by the master node according to any one of the first aspect and possible implementations of the first aspect.

According to a sixth aspect, a pod deployment apparatus is provided. The apparatus may be the worker node in the foregoing method embodiments, or may be a chip disposed in the worker node. The apparatus includes a communication interface and a processor. Optionally, the communication apparatus further includes a memory. The memory is configured to store a computer program or instructions, and the processor is separately coupled to the memory and the communication interface. When the processor executes the computer program or instructions, the apparatus performs, by using the communication interface, the method performed by the worker node according to any one of the second aspect and possible implementations of the second aspect.

According to a seventh aspect, a computer program product is provided. The computer program product includes computer program code. When the computer program code is run on a computer, the computer is enabled to perform the method performed by the master node according to any one of the first aspect and possible implementations of the first aspect.

According to an eighth aspect, a computer program product is provided. The computer program product includes computer program code. When the computer program code is run on a computer, the computer is enabled to perform the method performed by the worker node according to any one of the second aspect and possible implementations of the second aspect.

According to a ninth aspect, this application provides a chip system. The chip system includes a processor and a memory. The processor is electrically coupled to the memory. The memory is configured to store computer program instructions. The processor is configured to execute a part or all of the computer program instructions in the memory. When the part or all of the computer program instructions are executed, the processor is configured to implement functions of the master node according to the method in any one of the first aspect and possible implementations of the first aspect.

In a possible design, the chip system may further include a communication interface, and the communication interface is configured to send a signal processed by the processor, or receive a signal input to the processor. The chip system may include a chip, or may include a chip and another discrete device.

According to a tenth aspect, this application provides a chip system. The chip system includes a processor and a memory. The processor is electrically coupled to the memory. The memory is configured to store computer program instructions. The processor is configured to execute a part or all of the computer program instructions in the memory. When the part or all of the computer program instructions are executed, the processor is configured to implement functions of the worker node according to the method in any one of the second aspect and possible implementations of the second aspect.

In a possible design, the chip system may further include a communication interface, and the communication interface is configured to send a signal processed by the processor, or receive a signal input to the processor. The chip system may include a chip, or may include a chip and another discrete device.

According to an eleventh aspect, a computer-readable storage medium is provided. The computer-readable storage medium stores a computer program. When the computer program runs, the method performed by the master node according to any one of the first aspect and possible implementations of the first aspect is performed.

According to a twelfth aspect, a computer-readable storage medium is provided. The computer-readable storage medium stores a computer program. When the computer program runs, the method performed by the worker node according to any one of the first aspect and possible implementations of the first aspect is performed.

According to a thirteenth aspect, a pod deployment system is provided. The system includes: a master node that performs the method according to any one of the first aspect and possible implementations of the first aspect, and a worker node that performs the method according to any one of the second aspect and possible implementations of the second aspect.

DESCRIPTION OF EMBODIMENTS

Figure 1:
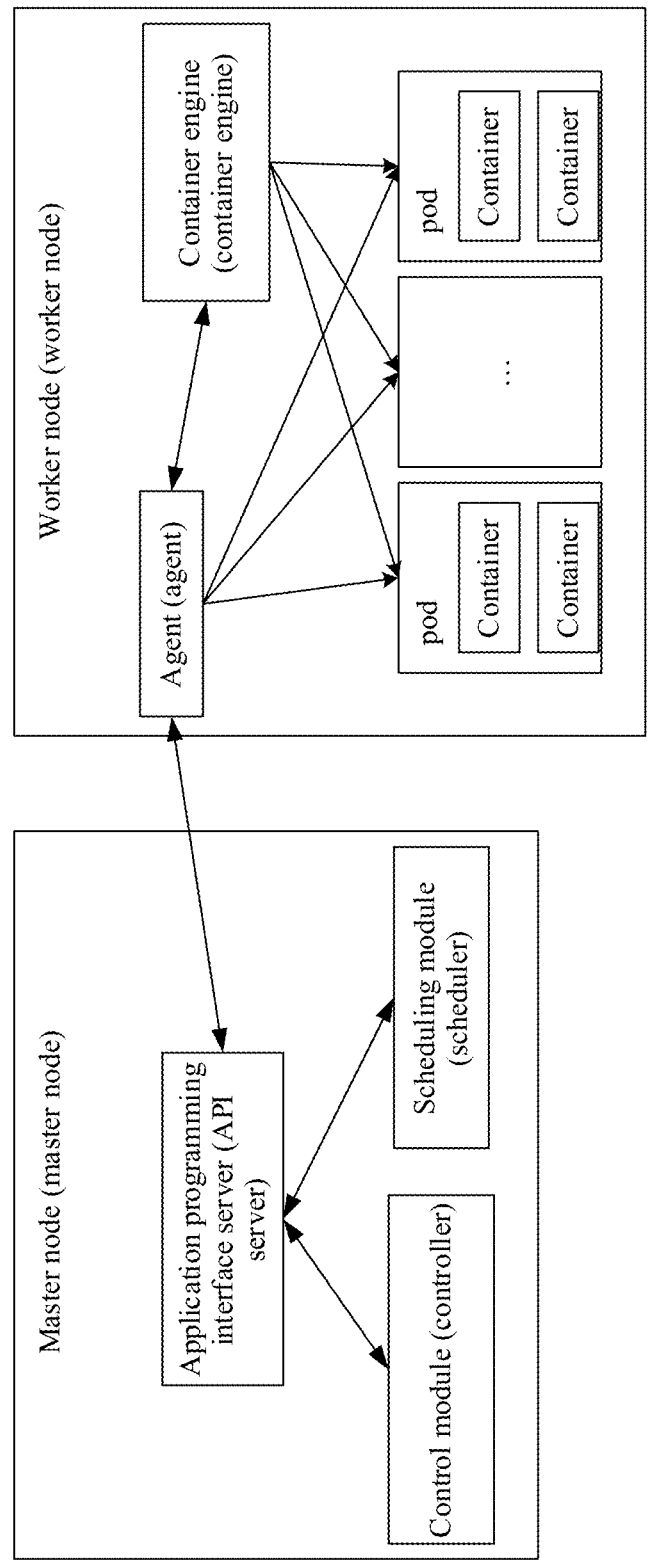
FIG. 1 is a cloud computing system according to an embodiment of this application.

The following describes in detail embodiments of this application with reference to accompanying drawings.

For ease of understanding embodiments of this application, the following describes some terms in embodiments of this application, to help a person skilled in the art have a better understanding.

(1) K8s is a docker-based open source container cluster management system. It can be used to construct a container scheduling service to enable a user to manage a cloud container cluster by using a K8s cluster without complex configuration. The system automatically selects an appropriate worker node to perform container cluster scheduling. The core concept of K8s is a container pod. One pod consists of a group of containers that work on a same worker node. The pod is a basic deployment unit of the K8s, and can include a plurality of containers, and the container logically identifies an instance of an application. For example, one web application consists of three components: a front end, a back end, and a database. The three components run on their respective containers. For this example, a pod may usually include three containers.

(2) A scheduling domain, also referred to as a resource set or a resource pool, may include various types of resources, for example, CPU resources, storage resources (for example, volume information), network resources (for example, network space), and memory resources (for example, huge pages).

The term "and/or" in this application describes an association relationship for describing associated objects and represents that three relationships may exist. For example, A and/or B may represent the following three cases: Only A exists, both A and B exist, and only B exists. The character "/" usually indicates an "or" relationship between the associated objects.

"A plurality of" in this application means two or more.

In the descriptions of this application, terms such as "first" and "second" are merely used for distinction and description, and should not be understood as an indication or implication of relative importance, or as an indication or implication of an order.

In addition, the term "for example" in embodiments of this application is used to represent giving an example, an illustration, or a description. Any embodiment or implementation solution described as an "example" in this application should not be explained as being more preferred or having more advantages than another embodiment or implementation solution. Exactly, the term "example" is used to present a concept in a specific manner.

Embodiments of this application provide a pod deployment method and apparatus. The method and the apparatus are based on a same technical concept. Principles by which the method and the apparatus resolve a problem are similar. Therefore, embodiments of the apparatus and the method may be cross-referenced. A repeated part is not described again.

The technical solutions in embodiments of this application may be applied to various cloud-based communication systems, for example, a long term evolution (LTE) system, a worldwide interoperability for microwave access (worldwide interoperability for microwave access, WiMAX) communication system, a future 5th generation (5G) system, for example, a new radio access technology (NR), and a future communication system.

For ease of understanding of embodiments of this application, an application scenario of this application is described below. A service scenario described in embodiments of this application is intended to describe the technical solutions of embodiments of this application more clearly, and does not constitute a limitation on the technical solutions provided in embodiments of this application. It may be learned by a person of ordinary skill in the art that, with emergence of a new service scenario, the technical solutions provided in embodiments of this application are also applicable to a similar technical problem.

As shown in FIG. 1, a master node and a worker node are included. A container cloud management platform (manage platform) (hereinafter referred to as a management system) may be deployed on the master node. For example, the cloud management platform is a K8s management system, and the management system may select, based on a service requirement, an appropriate worker node to deploy containers.

Specifically, the management system may be considered as a group of processes that manage a life cycle of a container. For example, the management system includes a control module (controller), a scheduling module (scheduler), an application programming interface server (API server) module, and the like. These processes implement management functions such as resource management, pod deployment, and system establishment for an entire cluster.

The API server module provides the only entry to resource objects, in other words, the API server module is an interface module that provides functions for a user. All other components need to use an API interface provided by the API server module to perform operations on resource data and monitor related resource data to implement a related network element function.

The control module centrally manages and controls various container models, for example, performs CRUD (create, read, update, and delete) operations on container models. For example, the container model may indicate one or more of the following information: a quantity of containers included in a pod, a type of an application program running in each container, a maximum quantity of each type of resources for each container when working, and a container that needs to exclusively occupy a CPU.

The scheduling module selects an appropriate worker node for a to-be-deployed unit (a container or a pod).

Components such as an agent component and a container engine component run on each worker node, and are responsible for managing a life cycle of a pod on the node. For example, the agent component is responsible for life cycle management, such as deployment, modification, monitoring, and deletion of a pod on the worker node, and periodically reports node status information to the API server module in the master node. The container engine component may be responsible for deploying a container. The container engine component may be, for example, a Docker component.

An example in which the management system is K8s is used for description. Because a pod is a basic deployment unit of K8s, a user, a tenant, or an administrator may deliver, to the management system based on a service requirement, an instruction for deploying one or more pods.

The instruction may include a quantity of pods, a quantity of containers included in each pod, a maximum quantity of each type of resources used by each container when working, and other information. The management system determines a sum of a maximum quantity of each type of resources used by each of a plurality of containers in one pod, and selects an appropriate worker node to deploy the one or more pods. The worker node allocates the sum of the maximum quantities of resources to the to-be-deployed one or more pods.

An example in which CPU resources are used when the pod is working is used for description. When the worker node allocates CPU resources to the pod, the worker node actually allocates CPU usage time periods to the pod. For example, allocating three CPUs by the worker node to the pod may be understood as allocating three CPU usage time periods by the worker node to the pod.

Figure 2A:
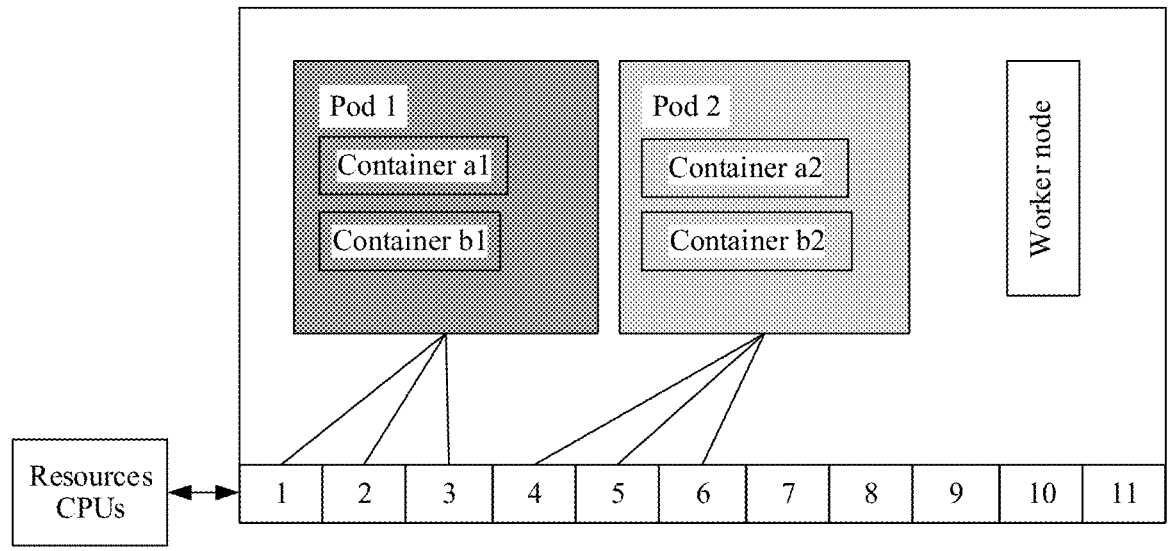
FIG. 2a, FIG. 2b, and FIG. 2c each are a schematic diagram of allocating resources to pods according to an embodiment of this application.

As shown in FIG. 2a, two pods, namely, a pod 1 and a pod 2, are deployed on a worker node. Either of the pods includes two containers. Each of containers a1 and a2 uses a maximum of two CPUs when the container is working. Each of containers b1 and b2 uses a maximum of one CPU when the container is working. In this case, the worker node allocates three CPUs to the two pods. It is assumed that the worker node has 11 CPUs.

In an example, the worker node allocates three CPUs to the pod 1: a CPU 1, a CPU 2, and a CPU 3; and allocates three CPUs to the pod 2: a CPU 4, a CPU 5, and a CPU 6. The container uses an entire working time period of a CPU allocated to the container. In this example, resources allocated by the worker node to different pods are isolated from each other. Containers in one pod cannot use resources allocated to another pod at any time. In other words, the container in the pod 1 cannot use the CPU 4, the CPU 5, and the CPU 6 that are allocated to the pod 2. The container a1 can use any two CPUs of the CPU 1, the CPU 2, and the CPU 3 that are allocated to the pod 1, for example, the CPU 1 and the CPU 2, and the container b1 can use any one of the CPU 1, the CPU 2, and the CPU 3 that are allocated to the pod 1, for example, the CPU 1, the CPU 2, or the CPU 3. Similarly, the container in the pod 2 cannot use the CPU 1, the CPU 2, and the CPU 3 that are allocated to the pod 1. The container a2 can use any two CPUs of the CPU 4, the CPU 5, and the CPU 6 that are allocated to the pod 2. The container b2 can use any one of the CPU 4, the CPU 5, and the CPU 6 that are allocated to the pod 2.

In another example, resources allocated by the worker node to different pods are physically shared, and the different pods use the shared resource in different time periods.

Specifically, the worker node may specify a CPU group that can be used by the pod 1. A quantity of CPUs included in the CPU group is equal to a maximum quantity of CPUs required by the pod 1. For example, the worker node allocates the CPU 1 to the CPU 6 to the pod, and may further indicate the pod 1 to use 50% of a working time period of each of the CPU 1 to the CPU 6. Six times 50% equals 300%, which means that the pod 1 uses 300% of a working time period of a CPU. In other words, three CPUs are allocated to the pod 1. Similarly, the worker node may indicate the pod 2 to use another 50% of the time period of each of the CPU 1 to the CPU 6, which is also equivalent to allocating three CPUs to the pod 2.

During actual application, because applications run on different containers in one pod are different, working time periods of a plurality of containers in one pod may be different. In this case, when at least two containers in one pod use resources in different time periods, if resources are allocated to the pod based on a maximum quantity of resources used by each container when working, a resource waste is caused. In addition, when a plurality of containers in one pod is working, each of the plurality of containers generally does not use the maximum quantity of resources. In addition, even if a maximum quantity of resources are used by a container in one pod when the container is working, generally a case in which containers in a plurality of pods all use a maximum quantity of resources rarely occurs. In this case, if resources are allocated to the pod based on the maximum quantity of resources used by each container when working, a resource waste is caused.

Figure 2B:
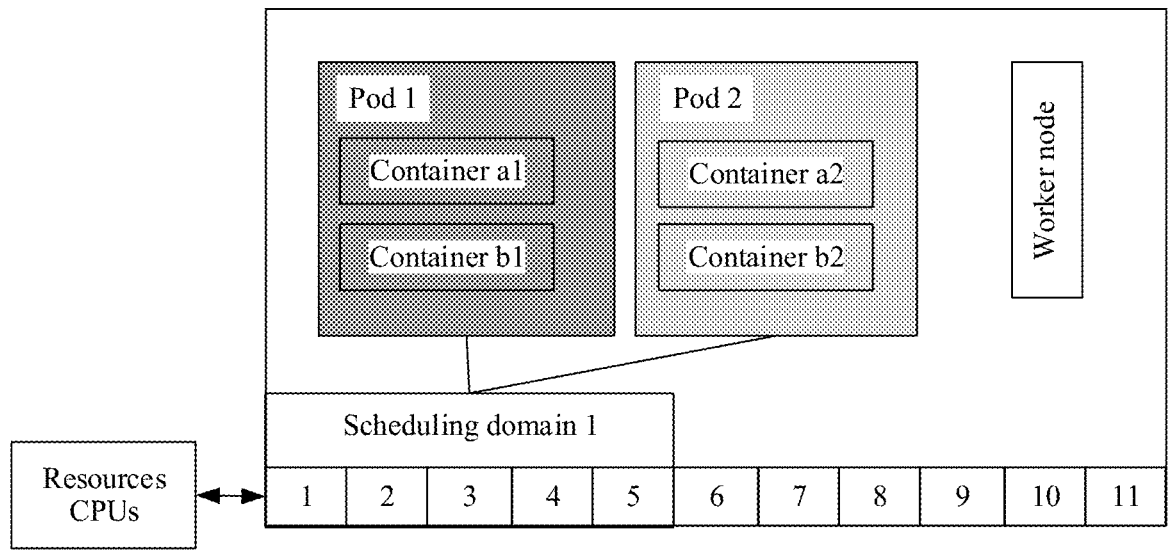

In view of this, this application provides a solution for deploying one or more scheduling domains on a worker node. The scheduling domain may be considered as a resource set, and may include a plurality of types of resources, such as a computing resource, a memory resource, a network bandwidth resource, and a disk resource. Resources in the scheduling domain can be used by containers in one pod or a plurality of pod. In this way, the containers in the plurality of pods may use resources in the same resource set. This improves resource utilization. For example, as shown in FIG. 2b, on a basis of FIG. 2a, a scheduling domain 1 is deployed on the worker node, the scheduling domain 1 occupies the CPU 1 to the CPU 5. Generally, the containers in the pod 1 and the pod 2 work in different time periods. Both the containers in the pod 1 and the containers in the pod 2 can use CPU resources in scheduling domain 1 when working.

On the basis that a deployment and scheduling solution is provided, functions related to the scheduling domain should also be added to the master node and the worker node shown in FIG. 1.

For example, a CRUD interface that supports the scheduling domain may be configured on the master node. For example, the interface is defined as a 1F1 interface, and the interface can execute a CRUD instruction. The control module in the master node may further be responsible for centralized management and control of various scheduling domain models. For ease of description, this function may be defined as a control submodule. The scheduling domain model may indicate resource information of the scheduling domain, for example, a type of occupied resources, and a quantity of each type of occupied resources. The scheduling domain model may further indicate types of application programs that use resources in the scheduling domain and other information. The scheduling module in the master node may further select an appropriate worker node for the to-be-deployed scheduling domain. For ease of description, this function may be defined as a scheduling submodule. Further, to associate a to-be-deployed pod with a corresponding scheduling domain, the container model may further indicate a scheduling domain model with which the pod model is associated.

For another example, the agent component in the worker node may be further responsible for managing and controlling a resource in the scheduling domain, for example, reserving a resource or releasing a resource. The agent component may include, for example, a kubelet component.

Figure 3:
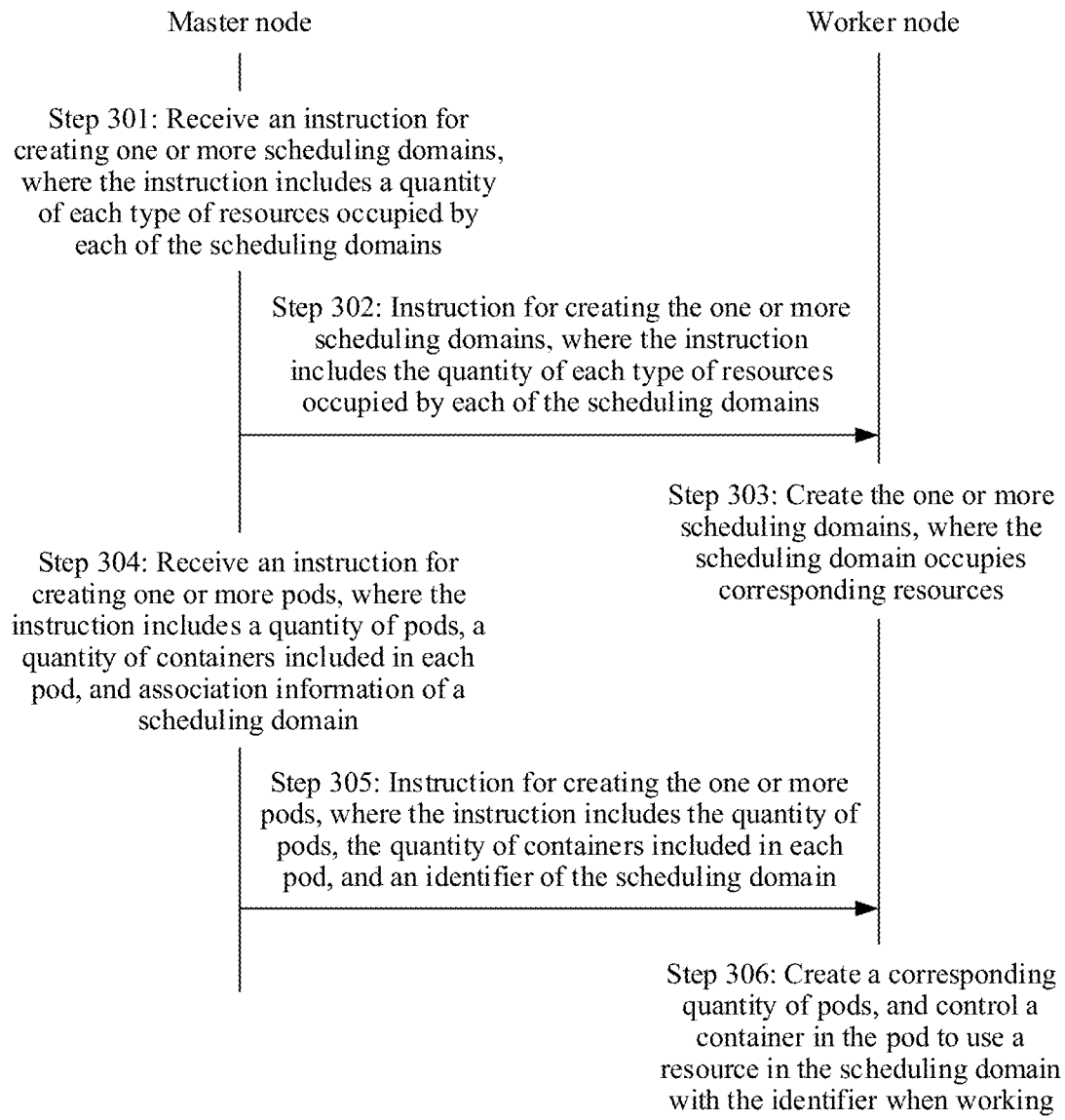
FIG. 3 is a schematic flowchart of deploying one or more pods according to an embodiment of this application.

Next, as shown in FIG. 3, a specific example is used to describe in detail a process of deploying a pod based on a scheduling domain.

Step 301: A master node receives an instruction for deploying one or more scheduling domains, where the instruction for deploying the one or more scheduling domains includes a quantity of each type of resources occupied by each of the scheduling domains, and the resources occupied by the scheduling domain are used by at least one pod.

When a user needs to deploy a pod, the user can request a management system to deploy the scheduling domain to reserve resources for the pod to be deployed subsequently. When the user deploys a scheduling domain, for example, the user may execute an instruction for creating a scheduling domain on a display interface of the management system, or may describe a file for creating a scheduling domain. Correspondingly, the master node on which the management system is located may receive the instruction for deploying the scheduling domain. During scheduling domain deployment, one instruction may be used to deploy a plurality of scheduling domains, and the master node deploys each of the scheduling domains in a same manner. In this application, an example in which one scheduling domain is deployed is used for description.

Generally, when the scheduling domain is being deployed, the quantity of each type of resources occupied by the deployed scheduling domain may be further specified, for example, a quantity of CPUs, a network bandwidth, a quantity of disks, and occupied memory usage.

When deploying a scheduling domain, the user may define association information of the scheduling domain, and an instruction for deploying the scheduling domain received by the master node may further include the association information of the to-be-deployed scheduling domain. The association information may be an identifier of the scheduling domain, a type of the scheduling domain, an identifier of a worker node, or the like.

In an example, resource information of the scheduling domain may be entered or selected by the user in the management system, in other words, the user indicates the quantity of each type of resources occupied by the scheduling domain.

In another example, when configuring a scheduling domain model, the user, an administrator, or a tenant may define resource information for the scheduling domain model. The instruction for deploying the one or more scheduling domains received by the master node indicates the quantity of scheduling domains to be created by using the scheduling domain model. In this case, the instruction for deploying the one or more scheduling domains includes resource information occupied by the scheduling domain.

Further, when the scheduling domain model is being configured, if a name of the scheduling domain model is further specified, the name of the scheduling domain model herein may be understood as a type of the scheduling domain. In this case, management information of the scheduling domain in the instruction for deploying the one or more scheduling domains may further include the type of the scheduling domain.

To further improve resource utilization, for any type of resources that are occupied by the scheduling domain and that are used by the pod, a quantity of the type of resources is less than a sum of a maximum quantity of the type of resources needed by each container when working, and is not less than a maximum quantity of the type of resources needed by any container when working, to ensure that all the containers can work normally when working in different time periods.

Step 302: The master node selects a worker node for deploying the one or more scheduling domains, and sends, to the worker node, the instruction for deploying the one or more scheduling domains. Correspondingly, the worker node receives the instruction for deploying the one or more scheduling domains sent by the master node. The instruction for deploying the one or more scheduling domains includes the quantity of each type of resources occupied by the scheduling domain.

The master node manages a plurality of worker nodes. After receiving the instruction for deploying the one or more scheduling domains, the master node may select an appropriate worker node from the plurality of worker nodes to deploy the one or more scheduling domains. After the appropriate worker node is selected, the worker node can be controlled to deploy the corresponding one or more scheduling domains.

When selecting the worker node for deploying the one or more scheduling domains, the master node may select, from the plurality of worker nodes according to an optimal resource policy, the worker node for deploying the one or more scheduling domains. Alternatively, when delivering the instruction for deploying the one or more scheduling domains to the master node, the user may indicate the identifier of the worker node on which the scheduling domain is deployed.

In other words, the instruction for deploying the one or more scheduling domains received by the master node further includes the identifier of the worker node. The master node may use the worker node corresponding to the identifier as the worker node for deploying the one or more scheduling domains.

After the master node deploys the scheduling domain on an appropriate worker node, the master node may store a correspondence between the identifier of the scheduling domain and the identifier of the worker node. Further, a correspondence between the identifier of the scheduling domain, the type of the scheduling domain, and the identifier of the worker node may be stored.

Step 303: The worker node deploys the one or more scheduling domains, where the scheduling domain includes a corresponding quantity of a corresponding type of resources in the instruction.

Optionally, after deploying the one or more scheduling domains, the worker node may feed back a deployment success response message to the master node.

Certainly, there may also be a case in which resources of the worker node are insufficient. For example, when the instruction for deploying the one or more scheduling domains received by the master node includes the identifier of the worker node, the master node deploys the scheduling domain on the worker node corresponding to the identifier. In this case, resources of the specified worker node may be insufficient, and the worker node may feed back a deployment failure response message to the master node. Correspondingly, the master node receives the deployment failure response message, and then selects an appropriate node to deploy the one or more scheduling domains until the deployment succeeds.

In an example, the master node may maintain a resource list for all the worker nodes. After the master node sends, to the worker node, the instruction for deploying the one or more scheduling domains, the master node may further update a remaining quantity of each type of resources in the worker node in the resource list. In addition, the master node may further update the remaining quantity of each type of resources in a resource pool, and the resource pool includes a plurality of worker nodes.

The foregoing describes a process of deploying the one or more scheduling domains on the worker node. The following describes a process of deploying one or more pods based on the scheduling domain.

Step 304: The master node receives an instruction for deploying one or more pods, where the instruction includes a quantity of pods, a quantity of containers included in each pod, and association information of a scheduling domain.

The user, the administrator, or the tenant may send the instruction for deploying the one or more pods to the management system, where the instruction for deploying the one or more pods may include the quantity of pods and the quantity of containers included in each pod. The one or more scheduling domains have been deployed by the management system, so that the instruction for deploying the one or more pods may include the association information of the scheduling domain. In this way, the management system finds an appropriate scheduling domain for the to-be-deployed one or more pods to use resources in the scheduling domain.

In an example, the quantity of containers included in each pod may be entered or selected by the user in the management system. In other words, the user indicates the quantity of containers included in the pod.

In another example, when configuring a container model, the user, the administrator, or the tenant may define, for the container model, the quantity of containers included in the pod. The instruction for deploying the one or more pods received by the master node indicates the quantity of pods to be created by using the container model.

Further, when configuring the container model, a type of the scheduling domain, namely, a name of a scheduling domain model, may be defined. The type of the scheduling domain is used to indicate a type of scheduling domain to which resources used by the to-be-deployed one or more pods belong.

It should be noted that a sequence of step 304 and step 301 is not limited.

Step 305: The master node sends, to the worker node based on the association information of the scheduling domain, the instruction for deploying the one or more pods. Correspondingly, the worker node receives the instruction for deploying the one or more pods, where the instruction includes the quantity of pods, the quantity of containers included in each pod, and the identifier of the scheduling domain to which resources used by the one or more pods belong.

The master node may find, based on the association information of the scheduling domain, the worker node for deploying the one or more pods, and determine the scheduling domain that is on the worker node and to which the resources can be used by the to-be-deployed one or more pods belong.

For finding the worker node for deploying the one or more pods based on the association information of the scheduling domain, in an example, the association information of the scheduling domain may include the identifier of the worker node, so that the master node may use a worker node with the identifier as the worker node for deploying the one or more pods. The master node selects the appropriate scheduling domain on the worker node for the to-be-deployed one or more pods. For another example, the association information of the scheduling domain may include the type of the scheduling domain. The master node may recognize the worker node based on the correspondence that is between the type of the scheduling domain and the identifier of the worker node and that is stored previously, and use the recognized worker node as the worker node for deploying the one or more pods. For another example, the association information of the scheduling domain includes the identifier of the scheduling domain. The master node may recognize, based on the correspondence that is between the identifier of the scheduling domain and the identifier of the worker node and that is stored previously, the worker node for deploying the one or more pods.

When determining the scheduling domain that is on the worker node and to which the resources can be used by the to-be-deployed one or more pods belong, if the type of the scheduling domain and the identifier of the scheduling domain in the association information of the scheduling domain are not limited, any scheduling domain on the worker node may be selected for use of the one or more pods. If the type of the scheduling domain in the association information of the scheduling domain is limited, any scheduling domain of the type on the worker node may be selected for use of the one or more pods. If the identifier of the scheduling domain in the association information of the scheduling domain is limited, the scheduling domain with the identifier on the worker node may be used for the one or more pods.

Further, the master node may store a correspondence between an identifier of a scheduling domain and an identifier of a pod.

Step 306: The worker node creates a corresponding quantity of pods, where each pod includes a corresponding quantity of containers; and the worker node controls, when any container is working, the container to use a resource in the scheduling domain with the identifier.

In the embodiment shown in FIG. 3, the scheduling domain is deployed on the worker node in advance to reserve a part of resources for the one or more pods. Further, when the one or more pods are being deployed, the one or more pods are enabled to use resources in the scheduling domain. The worker node does not need to allocate resources to the pod based on a sum of a maximum quantity of resources used by each container in the pod when each container is working. Containers in a plurality of pods can use resources in the scheduling domain in different time periods, to reduce a resource waste.

Applications running on containers in the plurality of pods have different performance requirements. Some applications have high performance requirements and some applications have low performance requirements. Further, it is assumed that the quantity of each type of resources occupied by the scheduling domain includes the quantity of CPUs occupied by the scheduling domain.

In an example, if the quantity of each type of resources occupied by the scheduling domain includes the quantity of CPUs occupied by the scheduling domain, the instruction for deploying the one or more scheduling domains received by the worker node may further include a quantity of CPUs for isolated use of a container in a pod and/or a quantity of CPUs for shared use of containers in a pod. The instruction for deploying the one or more pods received by the worker node may further include: an identifier of a first container that uses a CPU in isolation from another container. Further, the worker node controls, when the first container is working, the first container to use a CPU for isolated use in the scheduling domain, and controls, when another container different from the first container is working, the another container to use another CPU that is in the scheduling domain and that is not for isolated use. A resource for isolated use of a container may be understood as that the worker node allocates the resource to one container for independent use and the resource cannot be used by another container. A resource for shared use of containers may be understood as that the worker node allocates the resource to a plurality of containers for use, and the plurality of containers can use the resource at a same time or in different time periods.

In this way, the worker node allocates a corresponding quantity of CPUs in the scheduling domain to the first container for exclusive use, and the first container does not share these CPUs with another container. This improves performance of the first container.

Figure 2C:
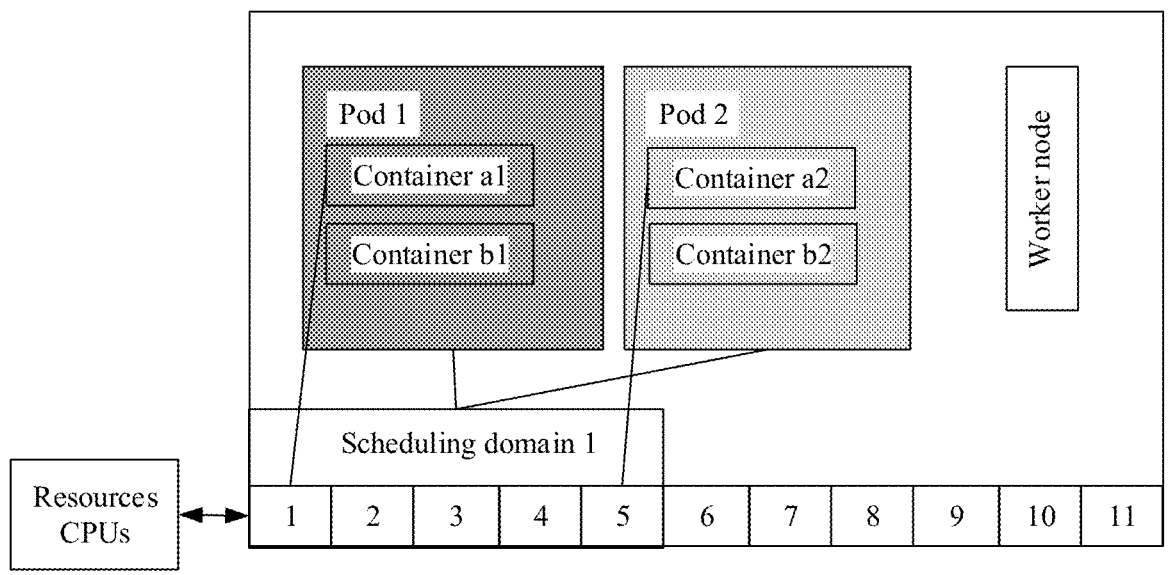

In FIG. 2c, on a basis of FIG. 2b, in the instruction for deploying the one or more scheduling domains, the quantity of CPUs for isolated use of the container in the pod is 2. The instruction indicates the container a1 in the pod 1 to use a CPU in isolation from another container, and the container a2 in the pod 2 to use a CPU in isolation from another container. The worker node may allocate the CPU 1 to the container a1 and the CPU 5 to the container based on the indication. In this way, the worker node controls the container a1 in the pod 1 to use the CPU 1 when working, and the container a2 in the pod 2 to use the CPU 5 when working. The CPU 1 and the CPU 5 cannot be used by another container. The worker node may control the container b1 and the container b2 to use any one or more of the CPU 2, the CPU 3, and the CPU 4 when working.

The following further describes details in the embodiment shown in FIG. 3 with reference to the API server interface module, the scheduling module (including the scheduling submodule), and the control module (including the control submodule) in the master node, and the agent component and the container engine component in the worker node in the foregoing descriptions.

Figure 4:
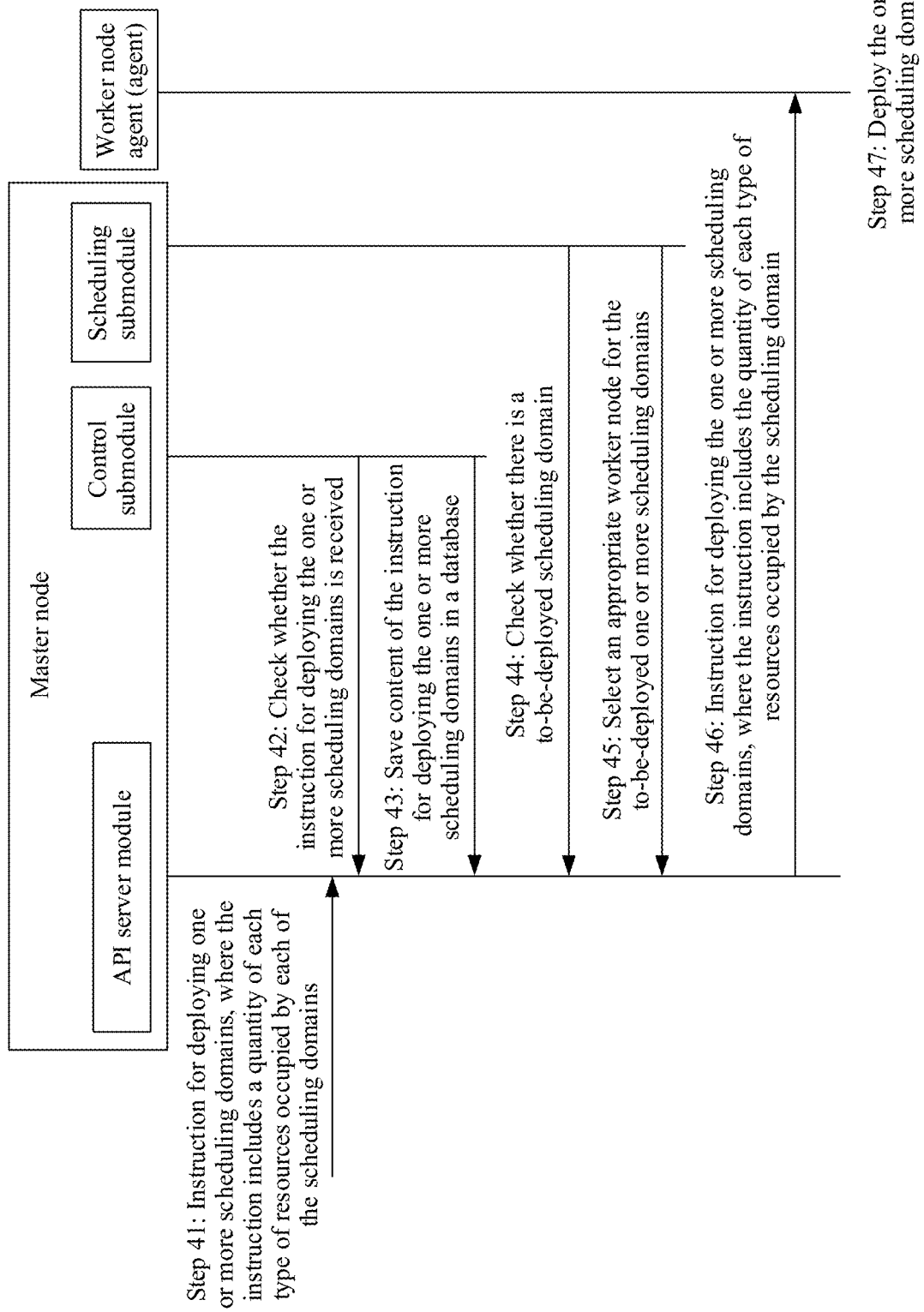
FIG. 4 is a schematic flowchart of deploying one or more scheduling domains according to an embodiment of this application.

As shown in FIG. 4, a process of deploying one or more scheduling domains is provided.

For a specific process of step 301, refer to step 41 shown in FIG. 4: A user may invoke an API server interface module to deliver an instruction for deploying one or more scheduling domains, where the instruction for deploying the one or more scheduling domains includes a quantity of scheduling domains and resource information of each of the scheduling domains, namely, a quantity of each type of resources occupied by each of the scheduling domains.

For a specific process of step 302, refer to step 42 to step 46 shown in FIG. 4.

Step 42: A control submodule in a control module in the master node may check whether the API server module receives the instruction for deploying the one or more scheduling domains.

Step 43: If the control submodule determines that the API server module receives the instruction for deploying the one or more scheduling domains, the control submodule may obtain content of the instruction for deploying the one or more scheduling domains, for example, the quantity of to-be-deployed scheduling domains and information about resources occupied by each scheduling domain. Further, the control submodule saves the content of the instruction in a database, for example, a storage db, by using the API server module.

Step 44: A scheduling submodule in a scheduling module in the master node may check whether the API server module receives the instruction for deploying the one or more scheduling domains, in other words, determine whether there is a to-be-deployed scheduling domain. If the scheduling submodule determines that the API server module receives the instruction for deploying the one or more scheduling domains, the scheduling submodule may request the API server to access the database, and notify the scheduling submodule of information about the to-be-deployed one or more scheduling domains.

Step 45: If determining that there are the to-be-deployed one or more scheduling domains, the scheduling submodule may select an appropriate worker node for the to-be-deployed one or more scheduling domains, and notify the API server module of an identifier of the selected worker node.

Step 46: The API server module may send the instruction for deploying the one or more scheduling domains to an agent component in the worker node. Correspondingly, the agent component receives the instruction for deploying the one or more scheduling domains. The instruction for deploying the one or more scheduling domains indicates the information about the resources occupied by each of the scheduling domains, and may further indicate an identifier of the scheduling domain, and the like.

In an example, the agent component may subscribe to status information of the worker node from the API server module. When the API server module is updating a status of the worker node, the API server module may notify the agent component in the worker node. Updating of a status is, for example, deploying the one or more scheduling domains on the worker node.

Specifically, when there is a scheduling domain that needs to be deployed on the worker node, the API server module actively sends an instruction for deploying the scheduling domain to the agent component in the worker node.

For a specific process of step 303, refer to step 47 in FIG. 4: The agent component deploys corresponding one or more scheduling domains based on the instruction for deploying the one or more scheduling domains.

The agent reserves resources such as CPUs and memories based on the resource information in the instruction for deploying the one or more scheduling domains, and allocates resources to corresponding one or more scheduling domains.

The agent component may further create configuration information for the one or more scheduling domains, for example, create a directory corresponding to resources and create resource-related constraints, in other words, resources allocated to the scheduling domain, and may further create a network namespace.

As shown in FIG. 4, a process of deploying one or more scheduling domains is provided.

Figure 5:
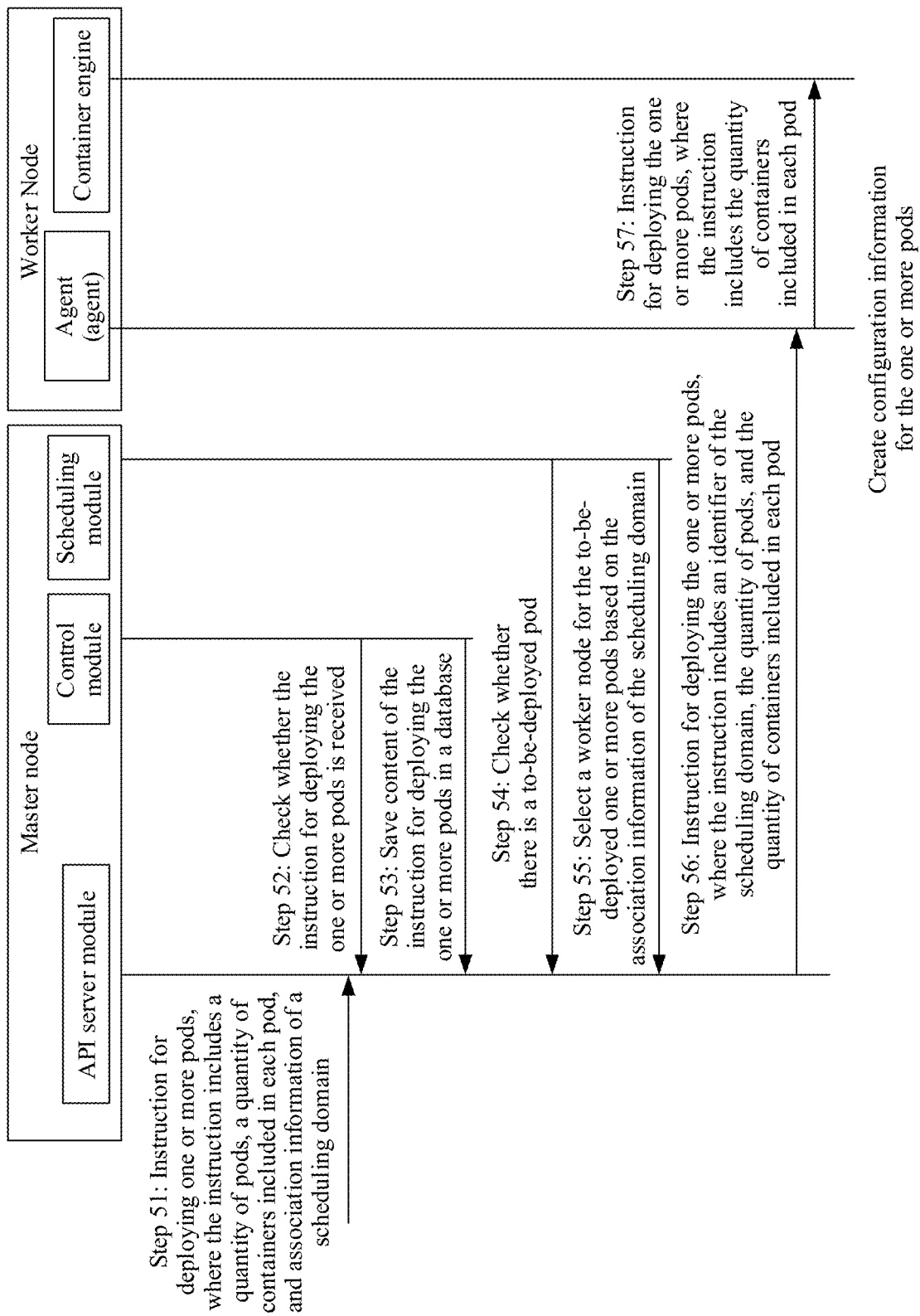
FIG. 5 is a schematic flowchart of deploying one or more pods according to an embodiment of this application.

For a specific process of step 304, refer to step 51 shown in FIG. 5. A user may invoke an API server interface module to deliver an instruction for deploying one or more pods, where the instruction for deploying the one or more pods includes a quantity of pods, a quantity of containers included in each pod, and may further include association information of a scheduling domain.

For a specific process of step 35, refer to step 52 to step 56 shown in FIG. 5.

Step 52: A control module in a master node may check whether the API server module receives the instruction for deploying the one or more pods.

Step 53: If the control module determines that the API server module receives the instruction for deploying the one or more pods, the control module may obtain content of the instruction for deploying the one or more pods, that is, the quantity of to-be-deployed pods, and the association information of the scheduling domain. Further, the control module saves the content of the instruction in a database by using the API server module.

Step 54: A scheduling module in the master node may check whether the API server module receives the instruction for deploying the one or more pods, in other words, determine whether there is a to-be-deployed pod. If the scheduling module determines that the API server module receives the instruction for deploying the one or more pods, the scheduling module may request the API server to access the database, and notify the scheduling module of information about the to-be-deployed one or more pods.

Step 55: If determining that there are the to-be-deployed one or more pods, the scheduling module may select an appropriate worker node based on the association information of the scheduling domain, and notify the API server module of an identifier of the selected worker node.

Step 56: The API server module sends the instruction for deploying the one or more pods to an agent component in the selected worker node. Correspondingly, the agent component receives the instruction for deploying the one or more pods, where the instruction indicates the quantity of pods, the quantity of containers included in the pod, an identifier of the scheduling domain, and the like.

In an example, the agent component may subscribe to status information of the worker node from the API server module. When the API server module is updating a status of the worker node, the API server module may notify the agent component in the worker node. Updating of a status is, for example, deploying the one or more pods on the worker node. Specifically, when there is a pod that needs to be deployed on the worker node, the API server module actively sends an instruction for deploying the pod to the agent component in the worker node.

For a specific process of step 306, refer to step 57 in FIG. 5: The agent component notifies a container engine component of an instruction for creating one or more pods, and the container engine component deploys corresponding one or more pods based on the instruction.

The agent component may further create configuration information for the one or more pods, for example, create a directory corresponding to resources and resource-related constraints, in other words, a scheduling domain to which resources to be used belong, and may further create a network namespace.

In an example, the user may further request to delete a pod based on a service requirement. For example, the master node may receive an instruction for deleting the pod, where the instruction for deleting the pod includes an identifier of the pod. The master node determines, based on a stored correspondence between an identifier of a pod and an identifier of a worker node, a worker node on which the pod with the identifier is deployed, and sends, to the worker node, the instruction for deleting the pod. Correspondingly, the worker node receives the instruction for deleting the pod sent by the master node, where the instruction for deleting the pod includes the identifier of the pod; and the worker node can delete the pod with the identifier. It may be noted that resources in one scheduling domain may be used for a plurality of pods at the same time. If one of the pods is deleted due to a service requirement, a resource in the scheduling domain becomes idle. In this case, if a user needs to deploy a pod, the master node may select an appropriate scheduling domain for the to-be-deployed pod based on a status of resources in the scheduling domain and a pod that uses the resources, to avoid a resource waste.

In an example, the user may further request to delete a scheduling domain based on a service requirement. For example, the master node may receive an instruction for deleting a scheduling domain, where the instruction includes an identifier of the scheduling domain. The master node may determine whether there is a pod that uses a resource in the scheduling domain with the identifier. If yes, the scheduling domain with the identifier cannot be deleted, and in this case, the master node may send prompt information indicating that the scheduling domain cannot be deleted. If no pod uses any resource in the scheduling domain with the identifier, the master node sends the instruction for deleting the scheduling domain to a worker node on which the scheduling domain is deployed, and correspondingly, the worker node receives the instruction for deleting the scheduling domain with the identifier. The worker node may execute the instruction and delete the scheduling domain with the identifier, in other words, release resources in the scheduling domain.

In another example, alternatively, the worker node may determine whether there is a pod that uses a resource in the scheduling domain with the identifier. For example, the master node receives the instruction for deleting the scheduling domain, where the instruction for deleting the scheduling domain includes the identifier of the scheduling domain. The master node sends, to the worker node, the instruction for deleting the scheduling domain, and correspondingly, the worker node receives the instruction for deleting the scheduling domain. The worker node determines whether there is the pod that uses the resource in the scheduling domain with the identifier. If yes, the scheduling domain of the identifier cannot be deleted. In this case, the worker node may feed back information that the scheduling domain cannot be deleted to the master node. If no pod uses any resource in the scheduling domain with the identifier, the worker node executes the instruction and deletes the scheduling domain with the identifier, and may further feed back that the deleting succeeds to the master node.

Figure 6:
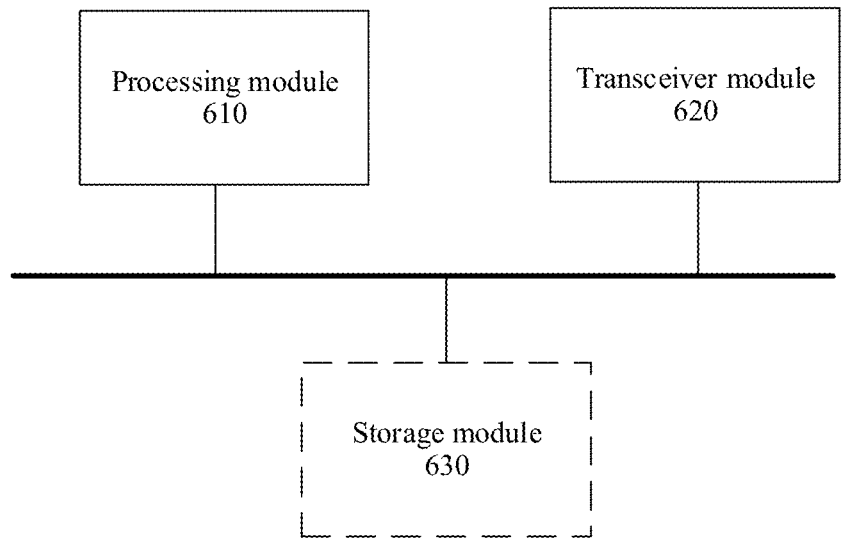
FIG. 6, FIG. 7, FIG. 8, and FIG. 9 each are a diagram of a structure of a pod deployment apparatus according to an embodiment of this application.

With reference to the pod deployment method in embodiments of this application described above, an apparatus in embodiments of this application is described below. Based on the same technical concept as the foregoing pod deployment method, as shown in FIG. 6, a pod deployment apparatus 600 is provided. The pod deployment apparatus 600 can perform steps performed by the master node in the foregoing method in FIG. 3. To avoid repetition, details are not described herein again. The pod deployment apparatus 600 may be a master node, or may be a chip used in the master node. The pod deployment apparatus 600 may include a transceiver module 620, a processing module 610, and optionally, a storage module 630. The processing module 610 may be separately connected to the storage module 630 and the transceiver module 620. The storage module 630 may also be connected to the transceiver module 620.

The transceiver module 620 is configured to receive an instruction for deploying one or more scheduling domains, where the instruction includes a quantity of each type of resources occupied by each of the scheduling domains, and the resources occupied by the scheduling domain are used by at least one pod.

The processing module 610 is configured to select a worker node for deploying the one or more scheduling domains.

The transceiver module 620 is further configured to: send, to the worker node, the instruction for deploying the one or more scheduling domains, where the instruction includes the quantity of each type of resources occupied by the scheduling domain; receive an instruction for deploying one or more pods, where the instruction includes a quantity of pods, a quantity of containers included in each pod, and association information of a scheduling domain; send, to the worker node based on the association information of the scheduling domain, the instruction for deploying the one or more pods, where the instruction includes the quantity of pods, the quantity of containers included in each pod, and an identifier of the scheduling domain to which resources by the pods belong.

In a possible implementation, for any type of resources that are occupied by the scheduling domain and that are used by the pod, a quantity of the type of resources is less than a sum of a maximum quantity of the type of resources needed by each container when working, and is not less than a maximum quantity of the type of resources needed by any container when working.

In a possible implementation, the association information of the scheduling domain is an identifier of the scheduling domain, a type of the scheduling domain, or an identifier of the worker node.

In a possible implementation, the processing module 610 is further configured to update a remaining quantity of each type of resources in the worker node in a resource list, and update a remaining quantity of each type of resources in a resource pool, where the resource pool includes a plurality of worker nodes.

In a possible implementation, the storage module 630 may be configured to store the remaining quantity of each type of resources in the resource pool, and/or the remaining quantity of each type of resources in the worker node.

In a possible implementation, when the processing module 610 is configured to select a worker node for deploying the one or more scheduling domains, the processing module 610 is specifically configured to: select, from a plurality of worker nodes according to a resource optimal policy, the worker node for deploying the one or more scheduling domains; or when the received instruction for deploying the one or more scheduling domains further includes the identifier of the worker node, use the worker node corresponding to the identifier as the worker node for deploying the one or more scheduling domains.

In a possible implementation, if the quantity of each type of resources occupied by the scheduling domain includes a quantity of CPUs occupied by the scheduling domain, the instruction for deploying the one or more scheduling domains further includes: a quantity of CPUs for isolated use of a container in a pod and/or a quantity of CPUs for shared use of containers in a pod, and the instruction for deploying the one or more pods further includes an identifier of a first container that uses a CPU in isolation from another container.

In a possible implementation, the transceiver module 620 is further configured to receive an instruction for deleting a scheduling domain, where the instruction includes an identifier of the scheduling domain. The processing module 610 is further configured to: determine whether there is a pod that uses a resource in the scheduling domain with the identifier, and if yes, send prompt information indicating that the scheduling domain cannot be deleted, or if no, send, by using the transceiver module, the instruction for deleting the scheduling domain to a worker node on which the scheduling domain is deployed.

In a possible implementation, the storage module 630 may be configured to store a correspondence between an identifier of a worker node and an identifier and/or a type of a scheduling domain deployed on the worker node. The storage module 630 may further store an identifier of a worker node and an identifier of a pod deployed on the worker node. The storage module 630 may further store an identifier of a pod and an identifier of a scheduling domain to which resources used by the pod belong.

The processing module 610 shown in FIG. 6 may include functions of the control module and the scheduling module in FIG. 4.

The transceiver module 620 shown in FIG. 6 may include functions of the API server module in FIG. 4.

Figure 7:
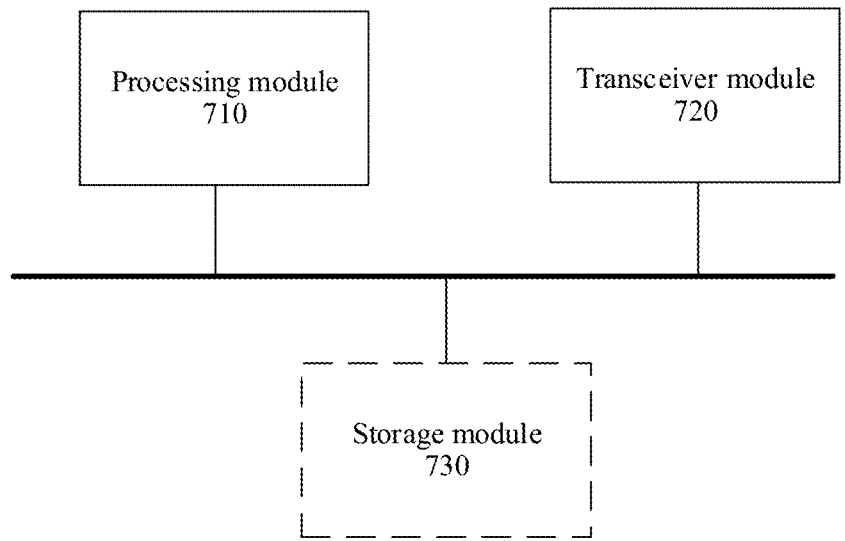

As shown in FIG. 7, a pod deployment apparatus 700 is provided. The pod deployment apparatus 700 can perform steps performed by the worker node in the foregoing method in FIG. 3. To avoid repetition, details are not described herein again. The pod deployment apparatus 700 may be a worker node, or may be a chip used in the worker node. The pod deployment apparatus 700 may include a transceiver module 720, a processing module 710, and optionally, a storage module 730. The processing module 710 may be separately connected to the storage module 730 and the transceiver module 720. The storage module 730 may also be connected to the transceiver module 720.

The transceiver module 720 is configured to receive an instruction that is for deploying one or more scheduling domains and that is sent by a master node, where the instruction includes a quantity of each type of resources occupied by each of the scheduling domains.

The processing module 710 is configured to deploy the one or more scheduling domains, where the scheduling domain includes a corresponding quantity of a corresponding type of resources.

The transceiver module 720 is further configured to receive an instruction that is for deploying one or more pods and that is sent by the master node, where the instruction includes a quantity of pods, a quantity of containers included in each pod, and an identifier of a scheduling domain to which resources used by the one or more pods belong.

The processing module 710 is further configured to: deploy a corresponding quantity of pods, where each pod includes a corresponding quantity of containers; and control, when any container is working, the container to use a resource in the scheduling domain.

In a possible implementation, for any type of resources that are occupied by the scheduling domain and that are used by the pod, a quantity of the type of resources is less than a sum of a maximum quantity of the type of resources needed by each container when working, and is not less than a maximum quantity of the type of resources needed by any container when working.

In a possible implementation, if the quantity of each type of resources occupied by the scheduling domain includes a quantity of CPUs occupied by the scheduling domain, the instruction for deploying the one or more scheduling domains further includes: a quantity of CPUs for isolated use of a container in a pod and/or a quantity of CPUs for shared use of containers in a pod, and the instruction for deploying the one or more pods further includes an identifier of a first container that uses a CPU in isolation from another container. When the processing module 710 is configured to control, when any container is working, the container to use a resource in the scheduling domain, the processing module 710 is specifically configured to: control, when the first container is working, the first container to use a CPU for isolated use in the scheduling domain; and control, when another container different from the first container is working, the another container to use another CPU that is in the scheduling domain and that is not for isolated use.

In a possible implementation, the storage module 730 may be configured to store an identifier of a pod and an identifier of a scheduling domain to which resources used by the pod with the identifier belong.

The processing module 710 shown in FIG. 7 may include functions of the container engine component shown in FIG. 5 and functions of the agent component shown in FIG. 5 other than signal sending and receiving.

The transceiver module 720 shown in FIG. 7 may include functions of the agent component shown in FIG. 5 other than signal receiving and sending.

Figure 8:
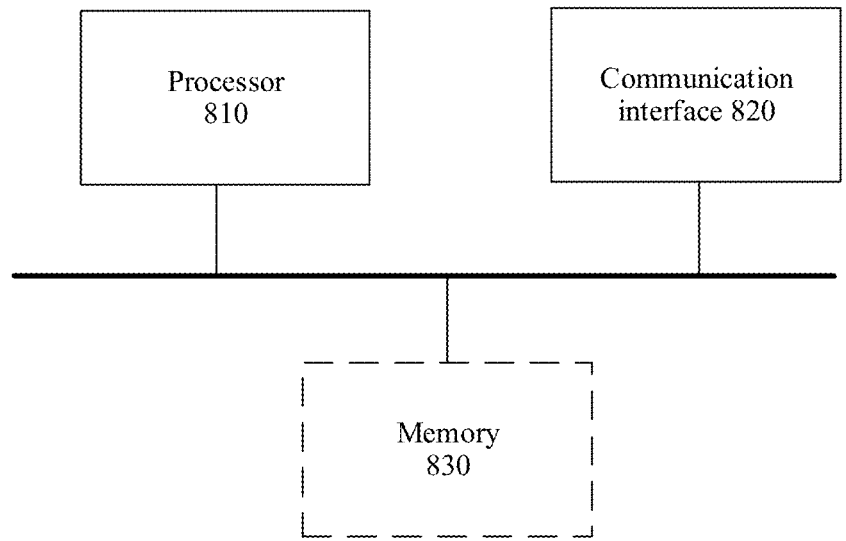

FIG. 8 is a schematic block diagram of a pod deployment apparatus 800 according to an embodiment of this application. It should be understood that the pod deployment apparatus 800 can perform steps performed by the master node in the method shown in FIG. 3. To avoid repetition, details are not described herein again. The pod deployment apparatus 800 includes a processor 810 and a communication interface 820, and optionally, further includes a memory 830. The processor 810 and the memory 830 are electrically coupled.

For example, the memory 830 is configured to store a computer program. The processor 810 may be configured to: invoke a computer program or instructions stored in the memory, to receive, by using the communication interface 820, an instruction for deploying one or more scheduling domains, where the instruction includes a quantity of each type of resources occupied by each of the scheduling domains, and the resources occupied by the scheduling domain are used by at least one pod; select a worker node for deploying the one or more scheduling domains; send, to the worker node by using the communication interface 820, the instruction for deploying the one or more scheduling domains, where the instruction includes the quantity of each type of resources occupied by the scheduling domain; receive an instruction for deploying one or more pods, where the instruction includes a quantity of pods, a quantity of containers included in each pod, and association information of a scheduling domain; and send, to the worker node based on the association information of the scheduling domain, the instruction for deploying the one or more pods, where the instruction includes the quantity of pods, the quantity of containers included in each pod, and an identifier of the scheduling domain to which resources by the pods belong.

In a possible implementation, for any type of resources that are occupied by the scheduling domain and that are used by the pod, a quantity of the type of resources is less than a sum of a maximum quantity of the type of resources needed by each container when working, and is not less than a maximum quantity of the type of resources needed by any container when working.

In a possible implementation, the association information of the scheduling domain is an identifier of the scheduling domain, a type of the scheduling domain, or an identifier of the worker node.

In a possible implementation, the processor 810 is further configured to update a remaining quantity of each type of resources in the worker node in a resource list, and update a remaining quantity of each type of resources in a resource pool, where the resource pool includes a plurality of worker nodes.

In a possible implementation, the memory 830 may be configured to store the remaining quantity of each type of resources in the resource pool, and/or the remaining quantity of each type of resources in the worker node.

In a possible implementation, when the processor 810 is configured to select a worker node for deploying the one or more scheduling domains, the processor 810 is specifically configured to: select, from a plurality of worker nodes according to a resource optimal policy, the worker node for deploying the one or more scheduling domains; or when the received instruction for deploying the one or more scheduling domains further includes the identifier of the worker node, use the worker node corresponding to the identifier as the worker node for deploying the one or more scheduling domains.

In a possible implementation, if the quantity of each type of resources occupied by the scheduling domain includes a quantity of CPUs occupied by the scheduling domain, the instruction for deploying the one or more scheduling domains further includes: a quantity of CPUs for isolated use of a container in a pod and/or a quantity of CPUs for shared use of containers in a pod, and the instruction for deploying the one or more pods further includes an identifier of a first container that uses a CPU in isolation from another container.

In a possible implementation, the communication interface 820 is further configured to receive an instruction for deleting a scheduling domain, where the instruction includes an identifier of the scheduling domain. The processor 810 is further configured to: determine whether there is a pod that uses a resource in the scheduling domain with the identifier, and if yes, send prompt information indicating that the scheduling domain cannot be deleted, or if no, send, by using the transceiver module, the instruction for deleting the scheduling domain to a worker node on which the scheduling domain is deployed.

In a possible implementation, the memory 830 may be configured to store a correspondence between an identifier of a worker node and an identifier and/or a type of a scheduling domain deployed on the worker node. The memory 830 may further store an identifier of a worker node and an identifier of a pod deployed on the worker node. The memory 830 may further store an identifier of a pod and an identifier of a scheduling domain to which resources used by the pod belong.

The processor 810 shown in FIG. 8 may include functions of the control module and the scheduling module in FIG. 4.

The communication interface 820 shown in FIG. 8 may include functions of the API server module in FIG. 4.

Figure 9:
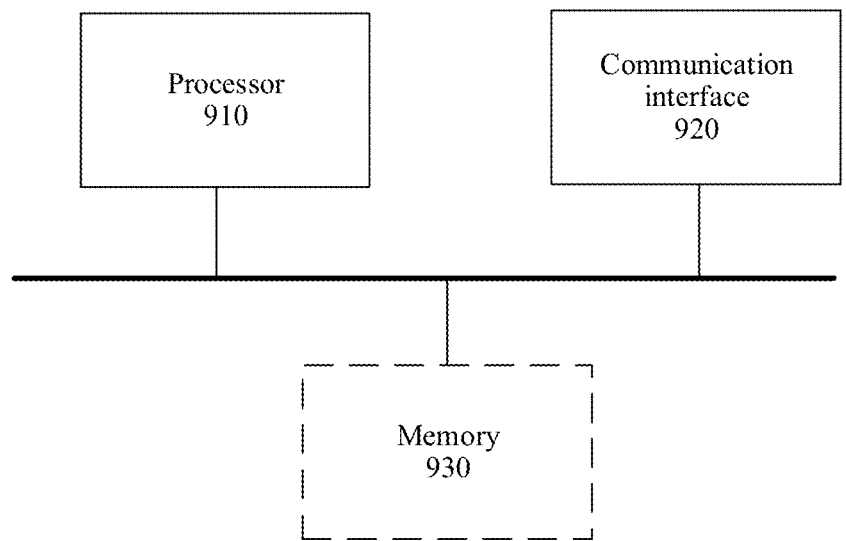

FIG. 9 is a schematic block diagram of a pod deployment apparatus 900 according to an embodiment of this application. It should be understood that the pod deployment apparatus 900 can perform steps performed by the worker node in the method shown in FIG. 3. To avoid repetition, details are not described herein again. The pod deployment apparatus 900 includes a processor 910 and a communication interface 920, and optionally, further includes a memory 930. The processor 910 and the memory 930 are electrically coupled.

For example, the memory 930 is configured to store a computer program. The processor 910 may be configured to: invoke a computer program or instructions stored in the memory, to receive, by using the communication interface 920, an instruction that is for deploying one or more scheduling domains and that is sent by a master node, where the instruction includes a quantity of each type of resources occupied by each of the scheduling domains. The processor 910 may be further configured to deploy the one or more scheduling domains, where the scheduling domain includes a corresponding quantity of a corresponding type of resources. The processor 910 may further receive, by using the communication interface 920, an instruction that is for deploying one or more pods and that is sent by the master node, where the instruction includes a quantity of pods, a quantity of containers included in each pod, and an identifier of a scheduling domain to which resources used by the one or more pods belong. The processor 910 may further deploy a corresponding quantity of pods, where each pod includes a corresponding quantity of containers. The processor 910 controls, when any container is working, the container to use resources in the scheduling domain.

In a possible implementation, for any type of resources that are occupied by the scheduling domain and that are used by the pod, a quantity of the type of resources is less than a sum of a maximum quantity of the type of resources needed by each container when working, and is not less than a maximum quantity of the type of resources needed by any container when working.

In a possible implementation, if the quantity of each type of resources occupied by the scheduling domain includes a quantity of CPUs occupied by the scheduling domain, the instruction for deploying the one or more scheduling domains further includes: a quantity of CPUs for isolated use of a container in a pod and/or a quantity of CPUs for shared use of containers in a pod, and the instruction for deploying the one or more pods further includes an identifier of a first container that uses a CPU in isolation from another container. When the processor 910 is configured to control, when any container is working, the container to use a resource in the scheduling domain, the processor 910 is specifically configured to: control, when the first container is working, the first container to use a CPU for isolated use in the scheduling domain; and control, when another container different from the first container is working, the another container to use another CPU that is in the scheduling domain and that is not for isolated use.

In a possible implementation, the memory 930 may be configured to store an identifier of a pod and an identifier of a scheduling domain to which resources used by the pod with the identifier belong.

The processor 910 shown in FIG. 9 may include functions of the container engine component shown in FIG. 5 and functions of the agent component shown in FIG. 5 other than signal sending and receiving.

The foregoing processor may be a central processing unit (CPU), a network processor (NP) or a combination of a CPU and an NP. The processor may further include a hardware chip or another general-purpose processor. The hardware chip may be an application-specific integrated circuit (ASIC), a programmable logic device (PLD), or a combination thereof. The PLD may be a complex programmable logic device (CPLD), a field-programmable gate array (FPGA), general array logic (GAL) and another programmable logic device, a discrete gate or transistor logic device, a discrete hardware component, or any combination thereof. The general-purpose processor may be a microprocessor, or the processor may be any conventional processor, or the like.

It should be further understood that the memory mentioned in embodiments of this application may be a volatile memory or a non-volatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory described in this application aims to include but is not limited to these memories and any memory of another proper type.

An embodiment of this application further provides a computer storage medium. The computer storage medium stores a computer program. When the computer program is executed by a computer, the computer is enabled to perform the foregoing pod deployment method.

An embodiment of this application further provides a computer program product including instructions. When the computer program product runs on a computer, the computer is enabled to perform the foregoing pod deployment method.

An embodiment of this application further provides a pod deployment system. The system includes a master node and a worker node that perform the foregoing pod deployment method.

A person skilled in the art should understand that the embodiments of this application may be provided as a method, a system, or a computer program product. Therefore, this application may use a form of a hardware-only embodiment, a software-only embodiment, or an embodiment in combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, a person skilled in the art can make changes and modifications to these embodiments once the person skilled in the art learns of the basic inventive concept. Therefore, the following claims are intended to be construed as to cover the preferred embodiments and all changes and modifications falling within the scope of this application.

Clearly, persons skilled in the art can make various modifications and variations to the embodiments of this application without departing from the spirit and scope of the embodiments of this application. This application is also intended to cover these modifications and variations to embodiments of this application provided that the modifications and variations fall within the scope of protection defined by the following claims and their equivalent technologies.

What is claimed is:

1. A pod deployment method, wherein the method comprises:
    receiving, by a master node, a first instruction for deploying one or more scheduling domains, wherein the first instruction comprises a quantity of each type of resources occupied by each of the one or more scheduling domains, and the resources occupied by the one or more scheduling domains are used by at least one pod of one or more pods;
    selecting, by the master node, a worker node for deploying the one or more scheduling domains, and sending, to the worker node, the first instruction for deploying the one or more scheduling domains;
    receiving, by the master node, a second instruction for deploying the one or more pods, wherein the second instruction for deploying the one or more pods comprises a quantity of pods, a quantity of containers comprised in each pod, and association information of a scheduling domain of the one or more scheduling domains; and
    sending, by the master node to the worker node based on the association information of the scheduling domain, the second instruction for deploying the one or more pods, the second instruction for deploying the one or more pods further comprises an identifier of the scheduling domain to which resources used by the one or more pods belong, wherein
a quantity resources occupied by the scheduling domain comprises a quantity of central processing units (CPUs) occupied by the scheduling domain,
the first instruction for deploying the one or more scheduling domains further comprises a quantity of CPUs for isolated use of a container in a pod of the one or more pods and a quantity of CPUs for shared use of containers in the pod, and
the second instruction for deploying the one or more pods further comprises an identifier of a first container that uses a CPU in isolation from another container.

2. The method according to claim 1, wherein for any type of resources that are occupied by the scheduling domain and that are used by a pod of the one or more pods, a quantity of the type of resources is less than a sum of a maximum quantity of the type of resources needed by each container when working, and is not less than a maximum quantity of the type of resources needed by any container when working.

3. The method according to claim 1, wherein the association information of the scheduling domain is the identifier of the scheduling domain, a type of the scheduling domain, or an identifier of the worker node.

4. The method according to claim 1, wherein after the sending, by the master node to the worker node, the first instruction for deploying the one or more scheduling domains, the method further comprises:
updating, by the master node, a remaining quantity of each type of resources in the worker node in a resource list, and updating a remaining quantity of each type of resources in a resource pool, wherein the resource pool comprises a plurality of worker nodes.

5. The method according to claim 1, wherein the selecting, by the master node, a worker node for the deploying one or more scheduling domains comprises:
selecting, by the master node from the plurality of worker nodes according to an optimal resource policy, the worker node for deploying the one or more scheduling domains; or
when the first instruction for deploying the one or more scheduling domains received by the master node further comprises an identifier of the worker node, selecting the worker node corresponding to the identifier as the worker node for deploying the one or more scheduling domains.

6. The method according to claim 1, further comprising:
receiving, by the master node, a third instruction for deleting the scheduling domain, wherein the third instruction comprises the identifier of the scheduling domain;
determining, by the master node, whether there is a pod of the one or more pods that uses a resource in the scheduling domain with the identifier; and
in response to determining that the pod uses the resource in the scheduling domain with the identifier, sending prompt information indicating that the scheduling domain cannot be deleted; and
in response to determining that the pod does not use the resource in the scheduling domain with the identifier, sending the third instruction for deleting the scheduling domain to a worker node on which the scheduling domain is deployed.

7. A pod deployment method, wherein the method comprises:

receiving, by a worker node, a first instruction for deploying one or more scheduling domains, wherein the first instruction comprises a quantity of each type of resources occupied by each of the one or more scheduling domains;
deploying the one or more scheduling domains, wherein the one or more scheduling domains comprise a corresponding quantity of a corresponding type of resources;
receiving, by the worker node, a second instruction for deploying one or more pods, wherein the second instruction for deploying one or more pods comprises a quantity of pods, a quantity of containers comprised in each pod, and an identifier of a scheduling domain of the one or more scheduling domains to which resources used by the one or more pods belong; and
deploying, by the worker node, the one or more pods, wherein each pod in the one or more pods comprises a quantity of containers; and controlling, by the worker node based on a container working, the container to use a resource in the scheduling domain, wherein
a quantity resources occupied by the scheduling domain comprises a quantity of central processing units (CPUs) occupied by the scheduling domain,
the first instruction for deploying the one or more scheduling domains further comprises a quantity of CPUs for isolated use of a container in a pod of the one or more pods and a quantity of CPUs for shared use of containers in the pod, and
the second instruction for deploying the one or more pods further comprises an identifier of a first container that uses a CPU in isolation from another container.

8. The method according to claim 7, wherein for any type of resources that are occupied by the scheduling domain and that are used by a pod of the one or more pods, a quantity of the type of resources is less than a sum of a maximum quantity of the type of resources needed by each container when working, and is not less than a maximum quantity of the type of resources needed by any container when working.

9. The method according to claim 7, wherein
the controlling, by the worker node based on the container working, the container to use a resource in the scheduling domain comprises:
controlling, by the worker node when the first container is working, the first container to use the CPU for isolated use in the scheduling domain, and controlling, when another container different from the first container is working, the other container to use another CPU that is in the scheduling domain and that is not for isolated use.

10. A pod deployment apparatus, wherein the apparatus comprises a transceiver; at least one processor; and
one or more memories coupled to the at least one processor and storing programming instructions for execution by the at least one processor to cause the pod deployment apparatus to:
receive a first instruction for deploying one or more scheduling domains, wherein the first instruction comprises a quantity of each type of resources occupied by each of the one or more scheduling domains, and the resources occupied by the one or more scheduling domains are used by at least one pod of one or more pods;
select a worker node for deploying the one or more scheduling domains, send, to the worker node, the first instruction for deploying the one or more scheduling domains;

receive a second instruction for deploying the one or more pods, wherein the second instruction for deploying the one or more pods comprises a quantity of pods, a quantity of containers comprised in each pod, and association information of a scheduling domain of the one or more scheduling domains; and send, to the worker node based on the association information of the scheduling domain, the second instruction for deploying the one or more pods, the second instruction for deploying the one or more pods further comprises an identifier of the scheduling domain to which resources used by the one or more pods belong, wherein a quantity resources occupied by the scheduling domain comprises a quantity of central processing units (CPUs) occupied by the scheduling domain, the first instruction for deploying the one or more scheduling domains further comprises a quantity of CPUs for isolated use of a container in a pod of the one or more pods and a quantity of CPUs for shared use of containers in the pod, and the second instruction for deploying the one or more pods further comprises an identifier of a first container that uses a CPU in isolation from another container.

11. The apparatus according to claim 10, wherein for any type of resources that are occupied by the scheduling domain and that are used by a pod of the one or more pods, a quantity of the type of resources is less than a sum of a maximum quantity of the type of resources needed by each container when working, and is not less than a maximum quantity of the type of resources needed by any container when working.

12. The apparatus according to claim 10, wherein the association information of the scheduling domain is the identifier of the scheduling domain, a type of the scheduling domain, or an identifier of the worker node.

13. The apparatus according to claim 10, wherein the programming instructions, when executed by the at least one processor, further cause the apparatus to update a remaining quantity of each type of resources in the worker node in a resource list, and update a remaining quantity of each type of resources in a resource pool, wherein the resource pool comprises a plurality of worker nodes.

14. The apparatus according to claim 10, wherein the programming instructions, when executed by the at least one processor, further cause the apparatus to:

select, from the plurality of worker nodes according to an optimal resource policy, the worker node for deploying the one or more scheduling domains; or when the received first instruction for deploying the one or more scheduling domains further comprises an identifier of the worker node, use the worker node corresponding to the identifier as the worker node for deploying the one or more scheduling domains.

15. The apparatus according to claim 10, wherein the programming instructions, when executed by the at least one processor, further cause the apparatus to receive an instruction for deleting the scheduling domain, wherein the instruction for deleting the scheduling domain comprises the identifier of the scheduling domain; and determine whether there is a pod of the one or more pods that uses a resource in the scheduling domain with the identifier, and if yes, send prompt information indicating that the scheduling domain cannot be deleted, and if no, send, by using the transceiver, the instruction for deleting the scheduling domain to a worker node on which the scheduling domain is deployed.

16. A pod deployment apparatus, wherein the apparatus comprises a transceiver; at least one processor; and one or more memories coupled to the at least one processor and storing programming instructions for execution by the at least one processor to cause the pod deployment apparatus to:

receive a first instruction for deploying one or more scheduling domains, wherein the first instruction comprises a quantity of each type of resources occupied by each of the one or more scheduling domains; and deploy the one or more scheduling domains, wherein the one or more scheduling domains comprise a corresponding quantity of a corresponding type of resources;

receive a second instruction for deploying one or more pods, wherein the second instruction for deploying one or more pods comprises a quantity of pods, a quantity of containers comprised in each pod, and an identifier of a scheduling domain of the one or more scheduling domains to which resources used by the one or more pods belong; and deploy the one or more pods, wherein each pod in the one or more pods comprises a corresponding quantity of containers; and control, when any container is working, the container to use a resource in the scheduling domain, wherein a quantity resources occupied by the scheduling domain comprises a quantity of central processing units (CPUs) occupied by the scheduling domain, the first instruction for deploying the one or more scheduling domains further comprises a quantity of CPUs for isolated use of a container in a pod of the one or more pods and a quantity of CPUs for shared use of containers in the pod, and the second instruction for deploying the one or more pods further comprises an identifier of a first container that uses a CPU in isolation from another container.

17. The apparatus according to claim 16, wherein for any type of resources that are occupied by the scheduling domain and that are used by a pod of the one or more pods, a quantity of the type of resources is less than a sum of a maximum quantity of the type of resources needed by each container when working, and is not less than a maximum quantity of the type of resources needed by any container when working.

18. The apparatus according to claim 16, wherein the programming instructions, when executed by the at least one processor, cause the apparatus to: control, when the first container is working, the first container to use the CPU for isolated use in the scheduling domain; and when another container different from the first container is working, control the other container to use another CPU that is in the scheduling domain and that is not for isolated use.

* * * * *